United States Patent
Ito et al.

(10) Patent No.: US 7,140,673 B2
(45) Date of Patent: Nov. 28, 2006

(54) HOOD STRUCTURE FOR VEHICLE

(75) Inventors: Katsuyoshi Ito, Toyota (JP); Koki Ikeda, Toyota (JP); Masaaki Morikawa, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 10/968,079

(22) Filed: Oct. 20, 2004

(65) Prior Publication Data
US 2005/0088016 A1    Apr. 28, 2005

(30) Foreign Application Priority Data
Oct. 27, 2003  (JP) .............................. 2003-365731

(51) Int. Cl.
*B60J 7/00* (2006.01)
(52) U.S. Cl. ................................ 296/193.11; 180/69.2
(58) Field of Classification Search .......... 296/193.11, 296/191, 187.04, 76; 180/69.2, 69.21
See application file for complete search history.

(56) References Cited

U.S. PATENT DOCUMENTS

| | | | |
|---|---|---|---|
| 5,124,191 A * | 6/1992 | Seksaria | 180/69.2 |
| 5,988,305 A * | 11/1999 | Sakai et al. | 296/187.04 |
| 6,048,022 A * | 4/2000 | Ishibashi et al. | 296/191 |
| 6,179,364 B1 * | 1/2001 | Takahashi | 296/76 |
| 6,824,202 B1 * | 11/2004 | Vismara et al. | 296/193.11 |
| 6,878,432 B1 * | 4/2005 | Ueda et al. | 428/174 |
| 6,883,627 B1 * | 4/2005 | Staines et al. | 180/69.2 |
| 2003/0141743 A1 * | 7/2003 | Miyahara et al. | 296/146.1 |
| 2003/0214151 A1 * | 11/2003 | Vismara et al. | 296/187.04 |
| 2005/0082874 A1 * | 4/2005 | Ikeda et al. | 296/193.11 |
| 2005/0082875 A1 * | 4/2005 | Ikeda et al. | 296/193.11 |
| 2005/0280287 A1 * | 12/2005 | Koura | 296/193.11 |

FOREIGN PATENT DOCUMENTS

| | | | |
|---|---|---|---|
| EP | 0 992 418 A2 | | 4/2000 |
| EP | 1510421 A2 * | | 3/2005 |
| EP | 1516803 A2 * | | 3/2005 |
| EP | 1518781 A2 * | | 3/2005 |
| JP | 60-124575 | | 7/1985 |
| JP | 60124575 A * | | 7/1985 |
| JP | 8-80873 | | 3/1996 |
| JP | 2004122973 A * | | 4/2004 |
| JP | 2004217008 A * | | 8/2004 |
| JP | 2005053265 A * | | 3/2005 |
| JP | 2005059708 A * | | 3/2005 |
| JP | 2005075163 A * | | 3/2005 |
| JP | 2005075174 A * | | 3/2005 |
| JP | 2005075176 A * | | 3/2005 |
| JP | 2005096512 A * | | 4/2005 |
| JP | 2005096608 A * | | 4/2005 |
| JP | 2005096629 A * | | 4/2005 |

(Continued)

*Primary Examiner*—Kiran B. Patel
(74) *Attorney, Agent, or Firm*—Finnegan, Henderson, Farabow, Garrett & Dunner, LLP (57) ABSTRACT

A level difference portion is formed on a food outer panel of a hood along a longitudinal direction of a vehicle body. A flange that connects a bone portion and a bone portion of a food inner panel is formed at a portion below the level difference portion of the hood outer panel. The flange of the hood inner panel extends so as to be curved along the level difference portion of the hood outer panel. The flange of the hood inner panel is connected to the level difference portion of the hood outer panel using an adhesive agent.

7 Claims, 8 Drawing Sheets

FOREIGN PATENT DOCUMENTS

| | | | | |
|---|---|---|---|---|
| JP | 2005104274 A | * | 4/2005 | |
| JP | 2005145224 A | * | 6/2005 | |
| JP | 2005212510 A | * | 8/2005 | |
| JP | 2005239092 A | * | 9/2005 | |
| JP | 2005247262 A | * | 9/2005 | |
| WO | WO 02/47961 A1 | | 6/2002 | |

* cited by examiner

HOOD STRUCTURE FOR VEHICLE

INCORPORATION BY REFERENCE

The disclosure of Japanese Patent Application No.2003-365731 filed on Oct. 27, 2003 including the specification, drawings and abstract is incorporated herein by reference in their entirety.

BACKGROUND OF THE INVENTION

1. Field of the Invention

The invention relates to a hood structure for a vehicle, and more particularly to a hood structure for a vehicle, which is applied to a vehicle such as an automobile.

2. Description of the Related Art

Japanese Patent Laid-Open Publication No. 8-80873 (JP-A-8-80873) discloses an example of a hood structure for a vehicle, which is applied to a vehicle such as an automobile. In the hood structure for a vehicle, a hood inner panel is provided on a rear surface side of a hood outer panel including a convex side flat portion and a concave side flat portion between which a level difference portion is provided, and a shock absorbing body is provided between the hood outer panel and the hood inner panel. The shock absorbing body is supported by the hood inner panel, and supports, from the rear surface side, the convex side flat portion in the vicinity of the level difference portion. In addition, the shock absorbing body is deformed and collapsed so that desired reaction force is generated when a displacement of the hood becomes a predetermined value.

However, in the hood structure for a vehicle disclosed in the Japanese Patent Laid-Open Publication No. 8-80873, the separate shock absorbing body needs to be provided between the hood outer panel and the hood inner panel, which leads to an increase in the number of components, an increase in weight, an increase in assembly cost, and deterioration of productivity. Also, when a hitting body hits the hood, incomplete collapse of the shock absorbing body occurs, and a portion of the shock absorbing body which is incompletely collapsed cannot be used as an energy absorbing stroke. Therefore, the energy absorbing stroke becomes small. Also, in the case where there are components such as an engine below the hood, and energy needs to be absorbed efficiently in a limited space, energy absorbing efficiency is reduced.

SUMMARY OF THE INVENTION

It is an object of the invention to provide a hood structure for a vehicle which can improve energy absorbing efficiency without providing a separate shock absorbing body even in the case where there is only a limited space.

A first aspect of the invention relates to a hood structure for a vehicle, which includes a hood outer panel constituting a vehicle body outer side portion of a hood; a hood inner panel constituting a vehicle body inner side portion of the hood; a level difference portion that is formed on the hood outer panel along a longitudinal direction of a vehicle; several bone portions that are formed in the hood inner panel along the longitudinal direction of the vehicle at predetermined intervals in a vehicle width direction; and a flange that connects adjacent bones among the several bones at a portion below the level difference portion.

Thus, the several bone portions are formed in the hood inner panel along the longitudinal direction of the vehicle at the predetermined intervals in the vehicle width direction, and the flange connects the adjacent bones among the several bones at the portion below the level difference portion. Therefore, the level difference portion has a double structure composed of the hood outer panel and the hood inner panel. As a result, torsional rigidity of the hood is improved. In addition, when a hitting body hits the vicinity of the level difference portion of the hood outer panel, the hood outer panel is unlikely to be inverted toward a lower side of the vehicle. Accordingly, since a primary peak value of an acceleration applied to the hitting body can be increased without providing a separate shock absorbing body. Since the separate shock absorbing body does not need to be provided, the amount of incomplete collapse can be reduced by the amount of incomplete collapse of the separate shock absorbing body. Thus, energy can be absorbed efficiently even in the case where there is only a limited space.

In the first aspect of the invention, the flange may be formed such that a cross section of the flange in the longitudinal direction of the vehicle is a straight line.

Thus, in addition to the structure in the first aspect, the cross section of the flange in the longitudinal direction of the vehicle is a straight line. Therefore, the flange is not inverted when the hitting body hits the vicinity of the level difference portion of the hood outer panel, and accordingly there is no excess stroke due to inversion of the flange. As a result, since tensile force is generated in the flange immediately after the hitting body hits the vicinity of the level difference portion of the hood outer panel, the primary peak value can be generated early.

In the first aspect of the invention, reinforcement means for improving surface rigidity may be formed in the flange.

Thus, in addition to the structure in the first aspect, the reinforcement means improves the surface rigidity of the flange. As a result, the flange is unlikely to be inverted when the hitting body hits the vicinity of the level difference portion of the hood outer panel, and stress is propagated to the bone portions easily. Accordingly, the primary peak value can be further increased, and the rigidity of the hood itself can be improved.

DETAILED DESCRIPTION OF THE PREFERRED EMBODIMENTS

Hereinafter, a hood structure for a vehicle according to an embodiment of the invention will be described with reference to FIG. 1 to FIG. 5.

In each of drawings, an arrow UP indicates an upward direction of a vehicle body, an arrow FR indicates a forward direction of the vehicle body, and an arrow IN indicates an inward direction of a vehicle width.

Figure 3:
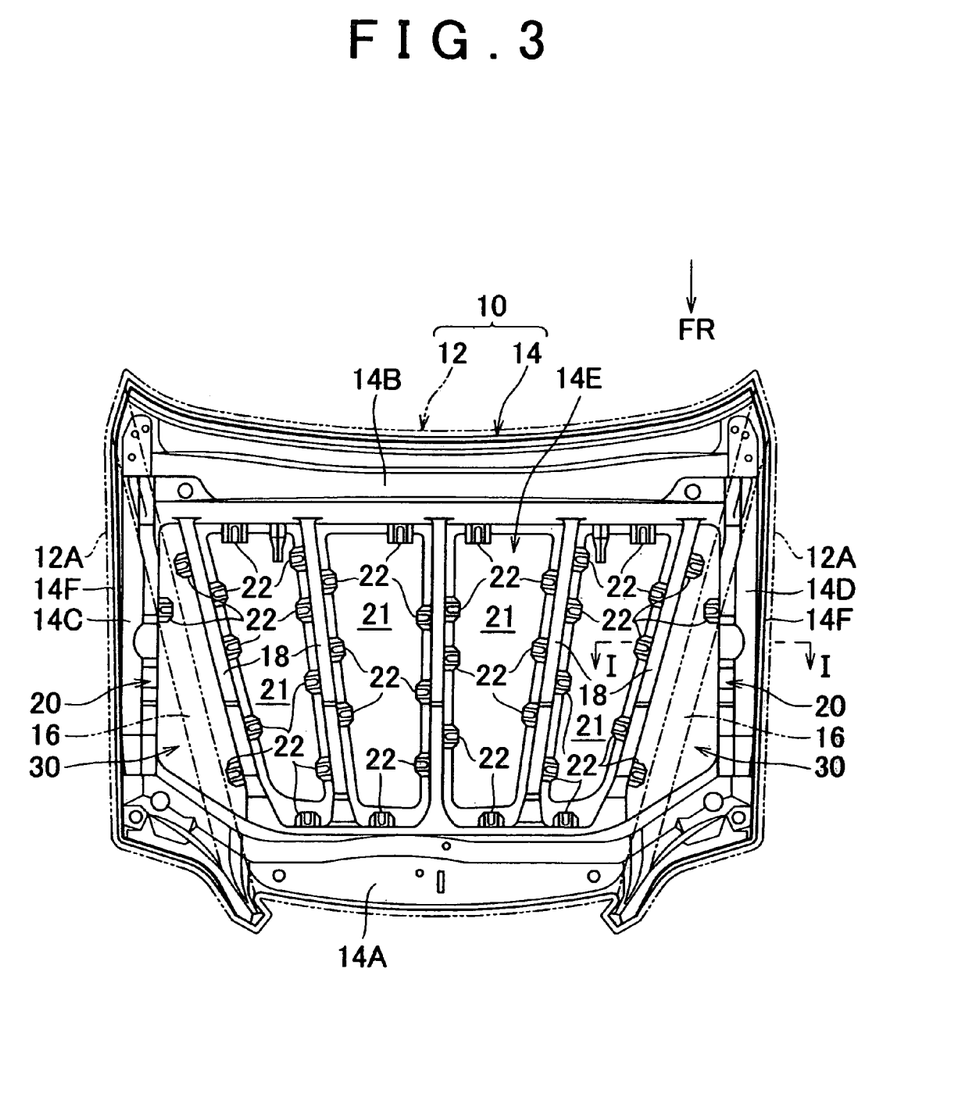
FIG. 3 is a plan view showing the hood structure for a vehicle according to the embodiment of the invention, which is seen from below a vehicle body.

As shown in FIG. 3, a hood 10 according to the embodiment includes a hood outer panel 12 and a hood inner panel 14. The hood outer panel 12 constitutes a vehicle body outer side surface of the hood 10. The hood inner panel 14 is provided on the inner side (i.e., on the rear surface side) of the hood outer panel 12, and constitutes a vehicle body inner side portion of the hood 10.

Figure 4:
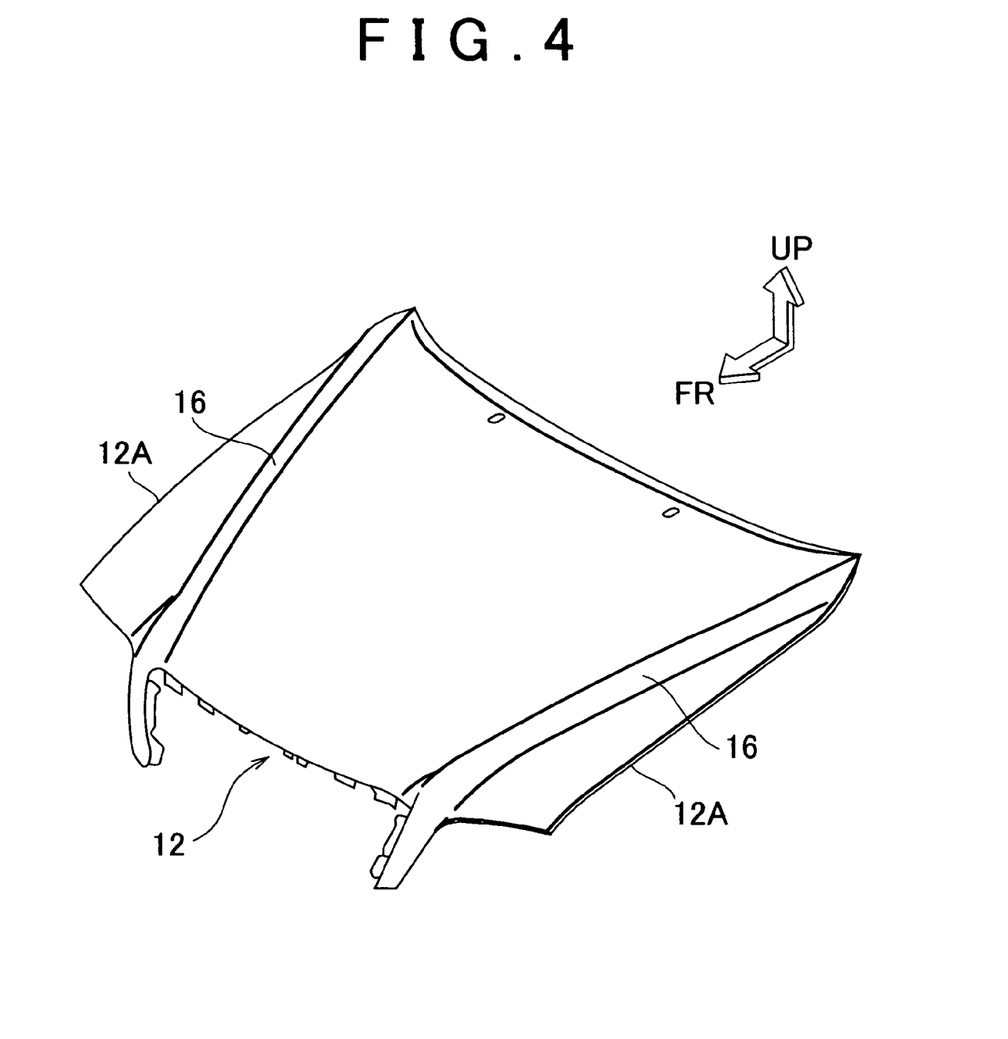
FIG. 4 is a perspective view showing a food outer panel of the hood structure for a vehicle according to the embodiment of the invention, which is seen obliquely from ahead of the vehicle body.

As shown in FIG. 4, level difference portions (relief portions) 16 are formed in the vicinity of vehicle-width-direction both ends of the hood outer panel 12 along a longitudinal direction of the vehicle body. Each of the level difference portions 16 is formed from a portion the hood outer panel 12 which is in a front side of the vehicle body and which is in an inner side in the vehicle width direction to a portion of the hood outer panel 12 which is in a rear side of the vehicle body and which is in an outer side in the vehicle width direction.

As shown in FIG. 3, several bone portions 18 are formed along the longitudinal direction of the vehicle at predetermined intervals in the vehicle width direction in a center region 14E of the hood inner panel 14. The center region 14E is a region other than a front edge portion 14A, a rear edge portion 14B, right and left vehicle-width-direction outer side line portions 14C and 14D of the hood inner panel 14, which are outer peripheral portions of the hood inner panel 14. A bone portion 20 is formed along the longitudinal direction of the vehicle at each vehicle-width-direction inner side portion which is positioned inside each of the vehicle-width-direction outer side line portions 14C and 14D.

Also, a notch 21 is formed between adjacent bone portions 18. Several adhesive agent application portions 22 are formed in an outer peripheral portion of the notch 21.

Figure 1:
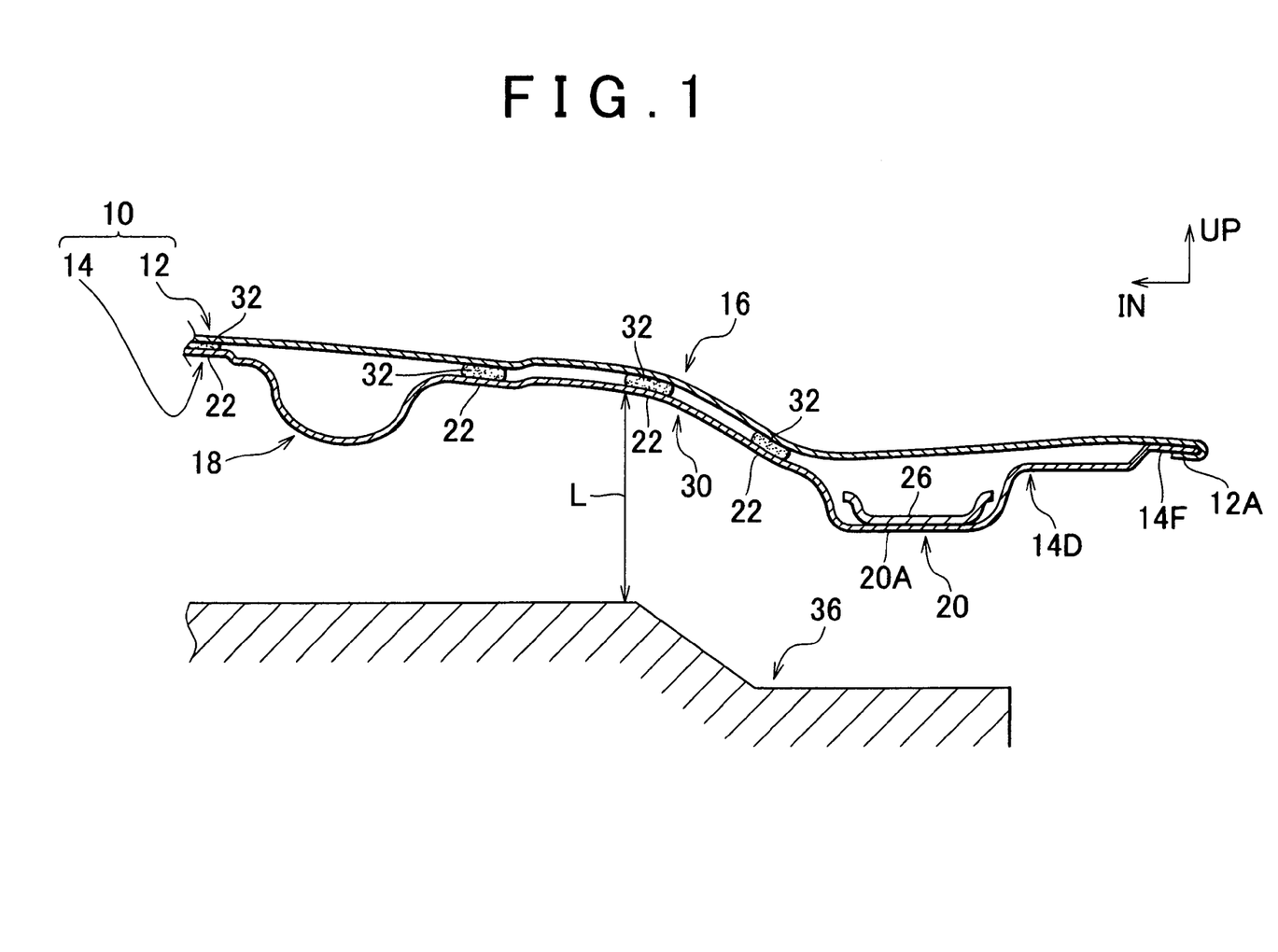
FIG. 1 is an enlarged cross sectional view taken along line I—I in FIG. 3.

As shown in FIG. 1, vehicle-width-direction both ends 12A of the hood outer panel 12 are joined to vehicle-width-direction both ends 14F of the hood inner panel 14 by hemming process.

Each of the bone portions 20 of the hood inner panel 14 protrudes toward a lower side of the vehicle body. A reinforcement 26 for a hood hinge is provided on an upper surface side of a bottom portion 20A of the bone portion 20. Meanwhile, each of the bone portions 18 formed in the center region 14E of the hood inner panel 14 protrudes toward the lower side of the vehicle body. A flange 30 that connects the bone portion 18 and the bone portion 20 is formed at a portion below the level difference portion 16 of the hood outer panel 12.

The flange 30 of the hood inner panel 14 extends so as to be curved along the level difference portion 16 of the hood outer panel 12. The flange 30 of the hood inner panel 14 is joined to the level difference portion 16 of the hood outer panel 12 through an adhesive agent 32 applied to the adhesive agent application portion 22. Also, engine room components 36 such as an engine are provided below the flange 30 of the hood inner panel 14.

Although the structure of the vehicle-width-direction outer side line portion 14C of the hood inner panel 14 is not shown, it is the same as that of the vehicle-width-direction outer side line portion 14D of the hood inner panel 14 shown in FIG. 1.

Next, effects of the embodiment will be described.

Figure 2:
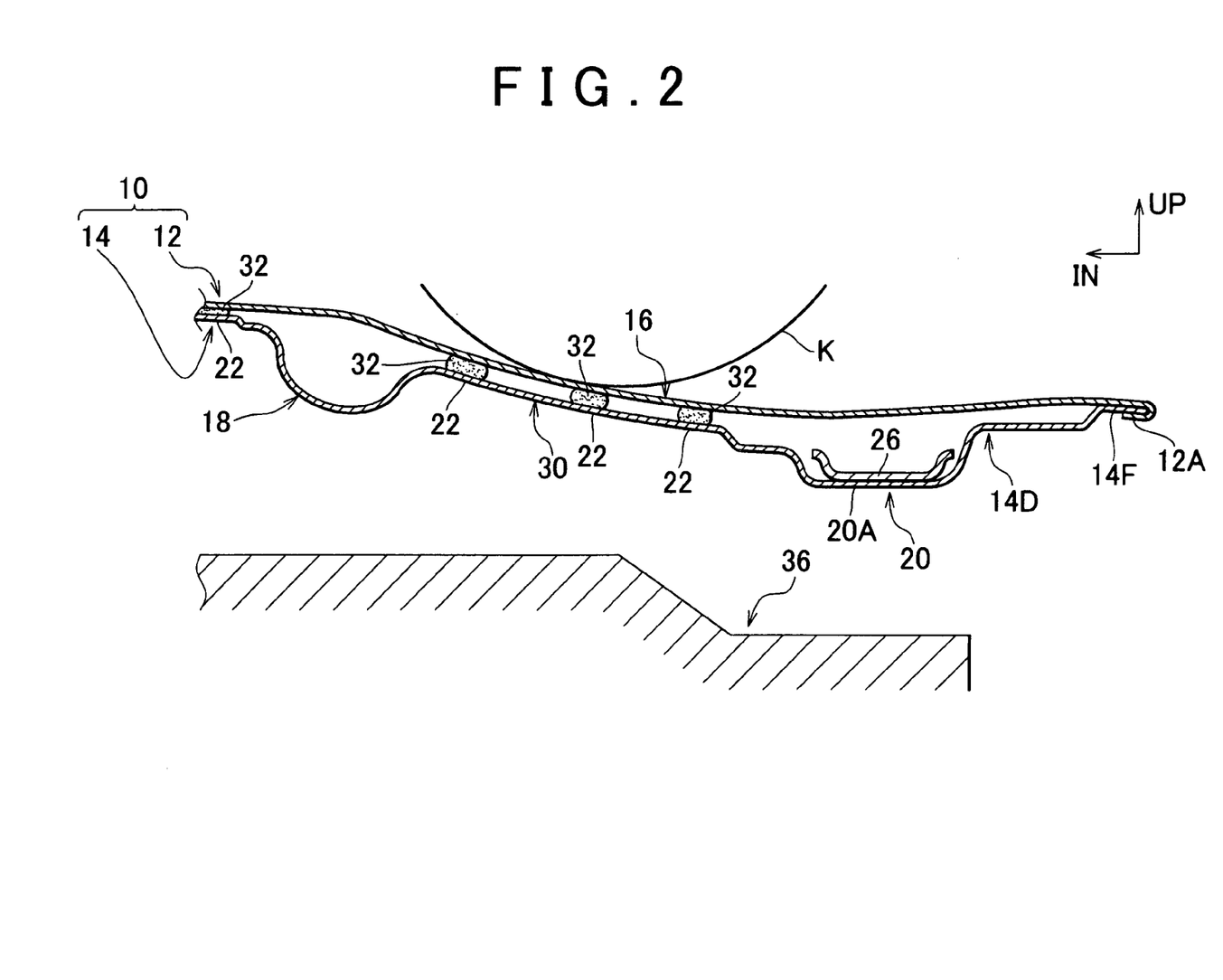
FIG. 2 is a cross sectional view showing a deformed state of a hood structure for a vehicle according to an embodiment of the invention, which corresponds to FIG 1.

In the embodiment, the flange 30 that connects the bone portion 18 and the bone portion 20 is formed at the portion below the level difference portion 16 of the hood outer panel 12. The hood 10 has a double structure composed of two panels, that is, the hood outer panel 12 and the hood inner panel 14. As a result, torsional rigidity of the hood 10 is improved. Also, as shown in FIG. 2, when a hitting body K hits the level difference portion 16 of the hood outer panel 12, the level difference portion 16 of the hood outer panel 12 is unlikely to be inverted toward the lower side of the vehicle.

Figure 5:
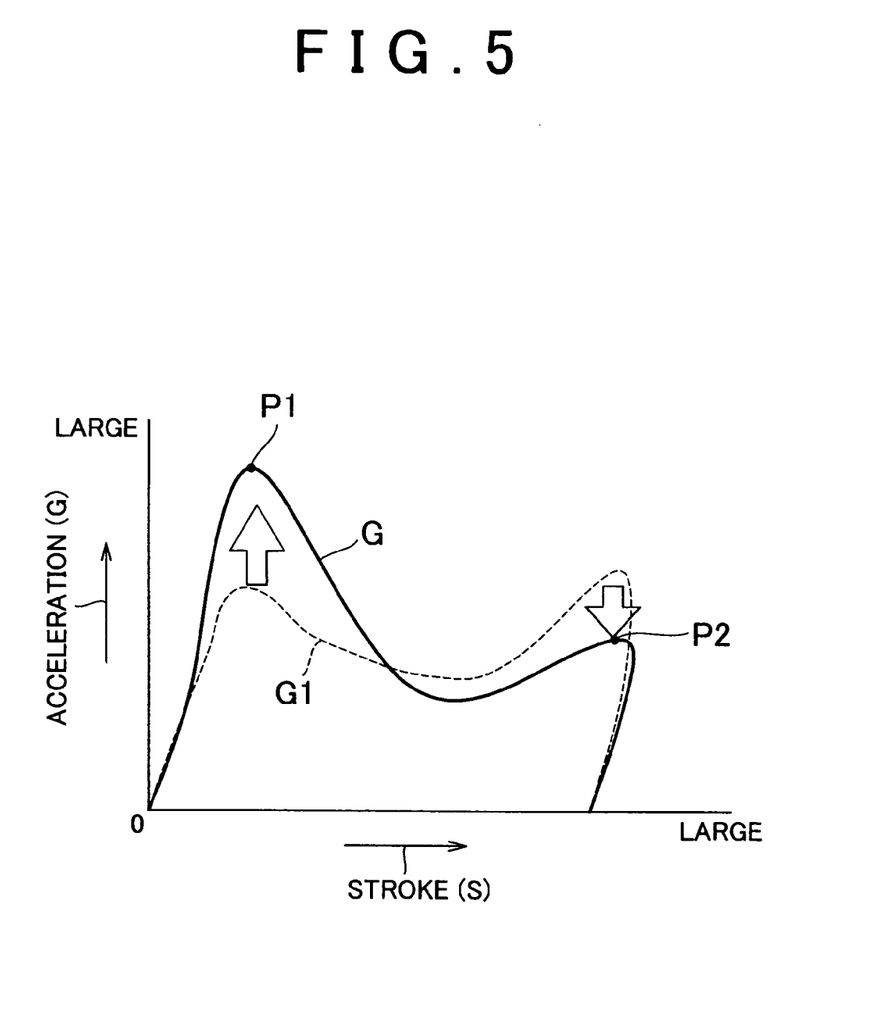
FIG. 5 is a graph showing a relation between a stroke of a hitting body and an acceleration in the hood structure for a vehicle.

Therefore, as shown by a solid line in FIG. 5, in a change in an acceleration G applied to the hitting body K (acceleration characteristic G) with respect to a stroke S of the hitting body K, a primary peak value P1 can be increased such that energy can be absorbed when a speed of the hitting body K is high, and a secondary peak value P2 can be decreased in the embodiment, as compared to an acceleration characteristic G1 shown by a dashed line in FIG. 5 in a comparative example in which the flange 30 is not formed. Accordingly, in the hood structure for a vehicle according to the embodiment, energy can be absorbed efficiently in a given space without providing a separate shock absorbing body.

Since a separate shock absorbing body does not need to be provided between the hood outer panel 12 and the hood inner panel 14, it is possible to prevent an increase in the number of components, an increase in weight, and an increase in assembly cost. In addition, incomplete collapse of the shock absorbing body does not occur. As a result, even when there is only a limited space, energy can be absorbed efficiently using the limited space effectively.

Also, since a separate shock absorbing body does not need to be provided between the hood outer panel 12 and the hood inner panel 14, the thickness of the hood 10 is small. As a result, a distance L between the hood inner panel 14 and the engine room components 36 such as the engine below the hood is large, and a secondary hit on the engine room components 36 can be prevented.

Also, in the embodiment, since the level difference portion 16 of the hood outer panel 12 is joined to the flange 30 of the hood inner panel 14 by the adhesive agent 32, tensile rigidity of the hood 10 is also improved.

Figure 6:
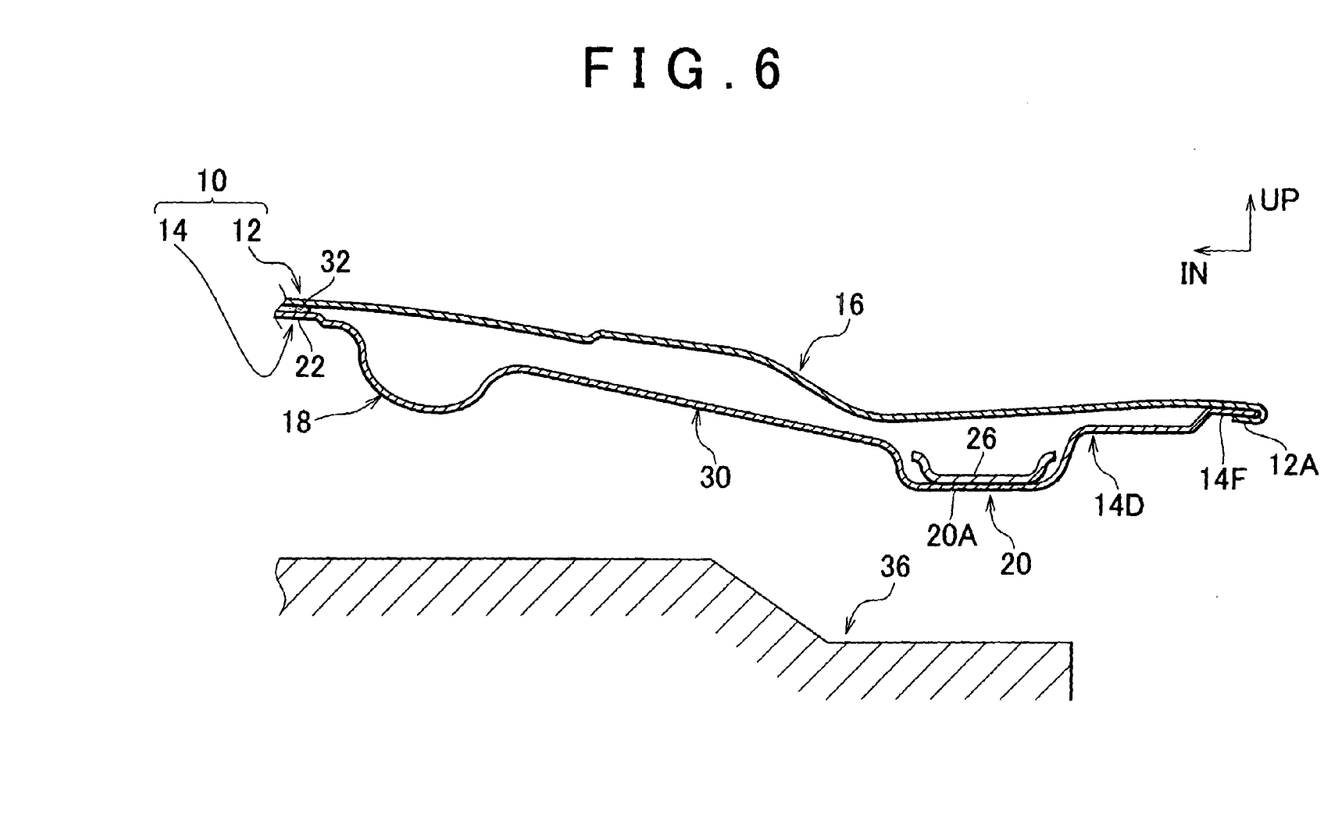
FIG. 6 is a cross sectional view showing a hood structure for a vehicle according to another embodiment of the invention, which corresponds to FIG. 1.
Figure 7:
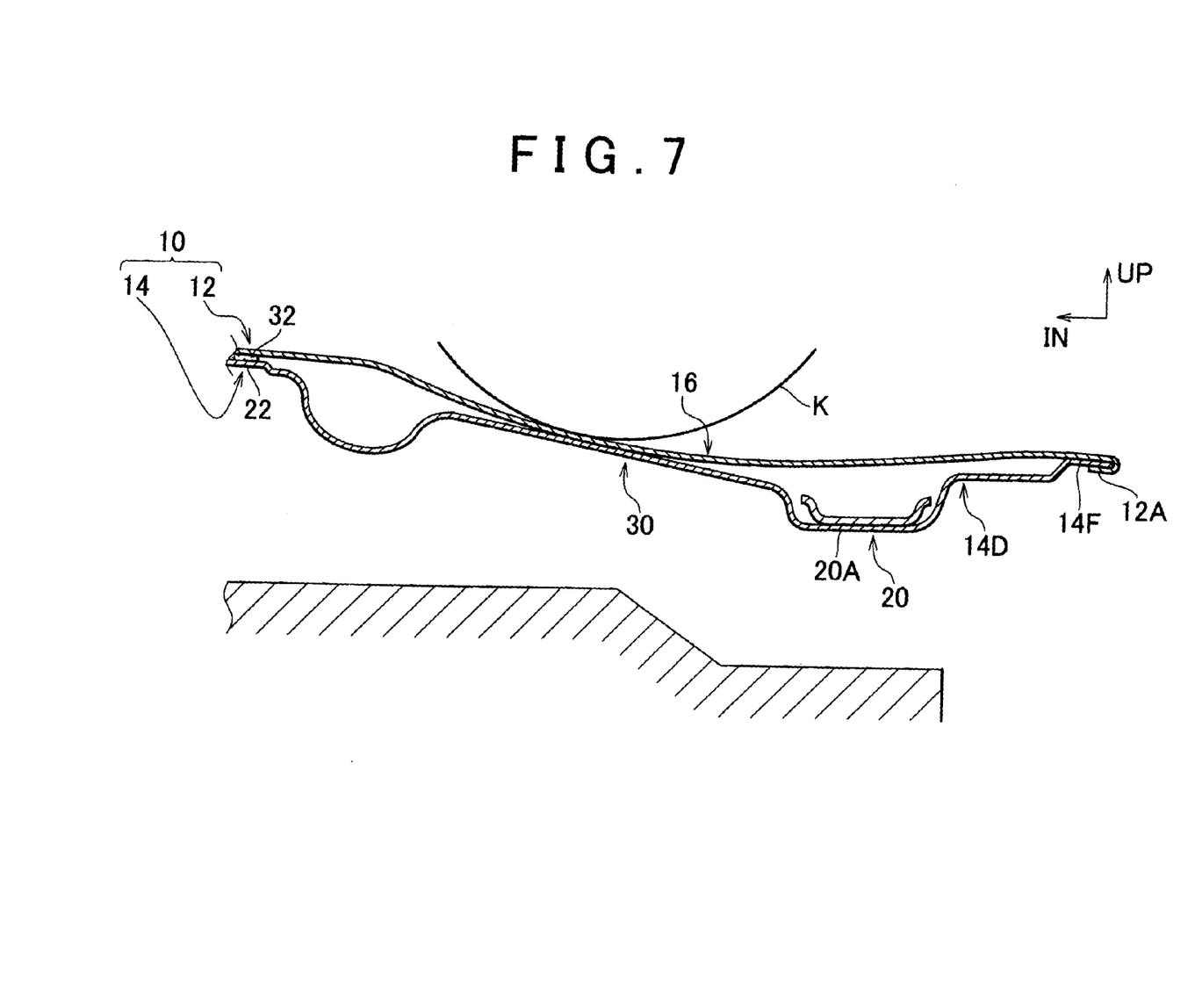
FIG. 7 is a cross sectional view showing a deformed state of the hood structure for a vehicle according to another embodiment of the invention, which corresponds to FIG. 6.

The specific embodiment of the invention has been described in detail so far. However, the invention is not limited to the embodiment. It is apparent to persons skilled in the art that the invention can be realized in various embodiments. For example, the flange 30 of the hood inner panel 14 extends so as to be curved along the level difference portion 16 of the hood outer panel 12, as shown in FIG. 1. Instead, as shown in FIG. 6, the flange 30 of the hood inner panel 14 may be formed such that the cross section of the flange 30 is a straight line in the longitudinal direction of the vehicle body. In this case, the flange 30 is not inverted when the hitting body hits the level difference portion 16 of the hood outer panel 12, and accordingly there is no excess stroke due to inversion of the flange 30, as shown in FIG. 7. As a result, tensile force is generated in the flange 30 immediately after the hitting body K hits the level difference portion 16 of the hood outer panel 12. Therefore, the primary peak value P1 of the acceleration can be generated early as compared to the acceleration characteristic G shown by the solid line in FIG. 5. Accordingly, even in the case where there is only a limited space, energy can be absorbed efficiently using the limited space effectively.

Figure 8:
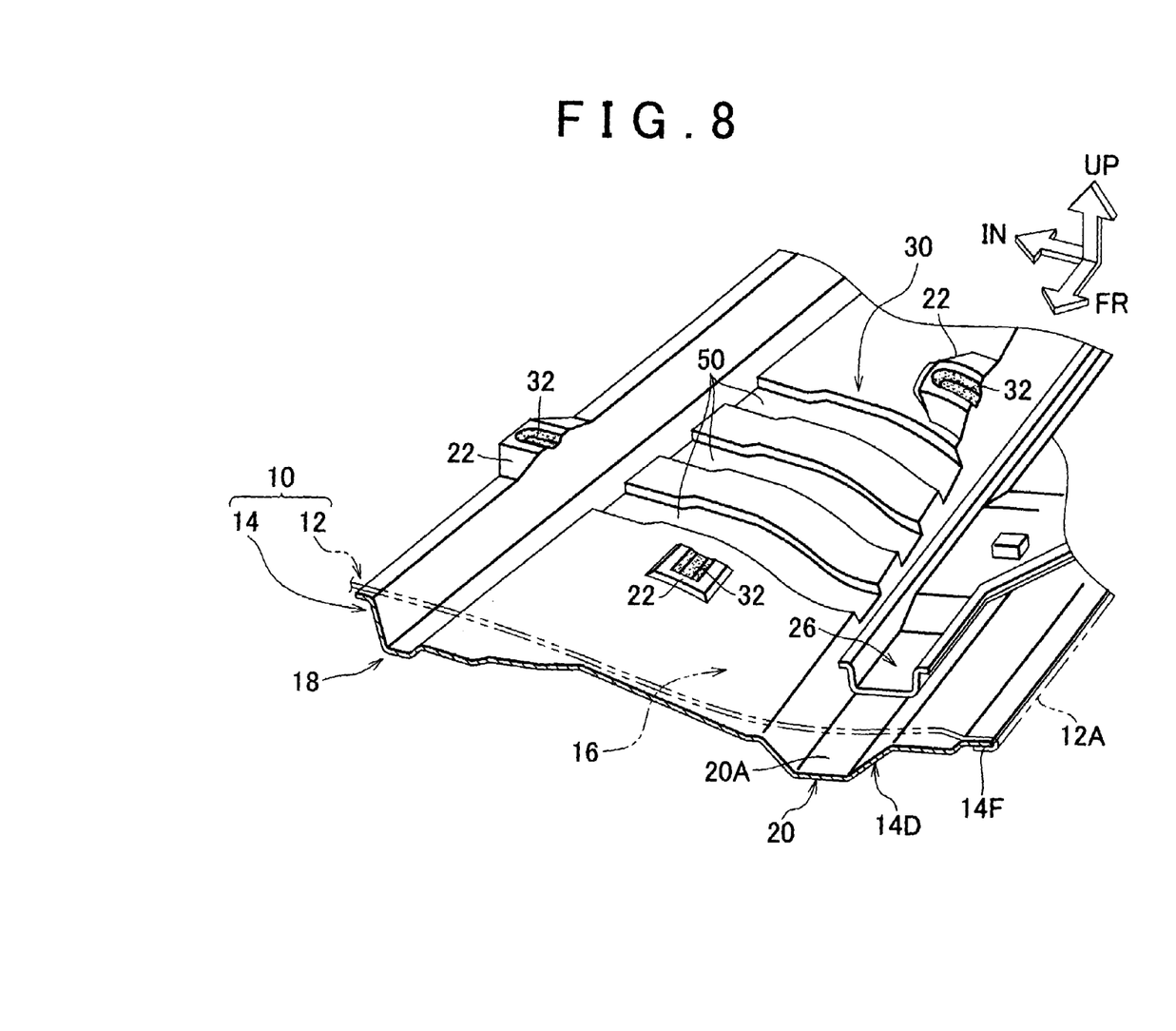
FIG. 8 is a perspective view showing a portion of the hood structure for a vehicle according to a yet another embodiment of the invention, which is seen obliquely from the outside of the vehicle body in a direction from a rear side toward a front side of the vehicle body.

Also, as shown in FIG. 8, a bead 50 that is reinforcement means (a reinforcement portion) for connecting the bone portion 18 and the bone portion 20 for improving surface rigidity may be provided in the flange 30 of the hood inner panel 14. In this case, since the bead 50 improves the surface rigidity of the flange 30, the flange 30 is more unlikely to be inverted, and stress is propagated to the bone portion 18 and the bone portion 20 more easily when the hitting body K hits the level difference portion 16 of the hood outer panel 12. As a result, the primary peak value P1 of the acceleration can be further increased, and the rigidity of the hood 10 itself can be improved, as compared to the acceleration characteristic G shown by the solid line in FIG. 5. Accordingly, even in the case where there is only a limited space, energy can be absorbed efficiently using the limited space effectively.

In the aforementioned embodiment, each of the level difference portions 16 is formed in the vicinity of each of vehicle-width both ends of the hood outer panel 12, from the portion which is in the front side of the vehicle body and which is in the inner side in the vehicle width direction to the portion which is in the rear side of the vehicle body and which is in the outer side in the vehicle width direction. However, in the case where each of the level difference portions 16 is formed on the hood outer panel 12 at another portion, the hood structure for a vehicle according to the invention can be applied.

Also, an opening portion may be formed in the flange 30 of the hood inner panel 14 in order to reduce weight.

What is claimed is:

1. A hood structure for a vehicle, comprising:
   a hood outer panel constituting a vehicle body outer side portion of a hood;
   a hood inner panel constituting a vehicle body inner side portion of the hood;
   a level difference portion that is formed on the hood outer panel along a longitudinal direction of a vehicle;
   several bone portions that are formed in the hood inner panel along the longitudinal direction of the vehicle at predetermined intervals in a vehicle width direction; and
   a flange that connects adjacent bone portions among the several bone portions at a portion below the level difference portion.

2. The hood structure for a vehicle according to claim 1, wherein the flange is formed such that a cross section of the flange in the longitudinal direction of the vehicle is a straight line.

3. The hood structure for a vehicle according to claim 1, wherein a reinforcement portion that improves surface rigidity is formed in the flange.

4. The hood structure for a vehicle according to claim 3, wherein the reinforcement portion is a bead.

5. The hood structure for a vehicle according to claim 1, wherein the level difference portion is formed from a portion of the hood outer panel which is in a front side of the vehicle body and which is in an inner side in the vehicle width direction to a portion of the hood outer panel which is in a rear side of the vehicle body and which is in an outer side in the vehicle width direction.

6. The hood structure for a vehicle according to claim 1, wherein a notch is formed between the adjacent bone portions.

7. The hood structure for a vehicle according to claim 1, wherein the flange extends so as to be curved along the level difference portion.

* * * * *

UNITED STATES PATENT AND TRADEMARK OFFICE
CERTIFICATE OF CORRECTION

PATENT NO. : 7,140,673 B2
APPLICATION NO. : 10/968079
DATED : November 28, 2006
INVENTOR(S) : Katsuyoshi Ito et al.

It is certified that error appears in the above-identified patent and that said Letters Patent is hereby corrected as shown below:

Title Page, item (57), ABSTRACT, line 1, "food" should read --hood--.

Title Page, item (57), ABSTRACT, line 4, "food" should read --hood--.

Signed and Sealed this

Tenth Day of April, 2007

JON W. DUDAS
*Director of the United States Patent and Trademark Office*